US012771533B2

(12) United States Patent
Bedington et al.

(10) Patent No.: US 12,771,533 B2
(45) Date of Patent: Oct. 20, 2026

(54) SECURE SYMMETRIC KEY DISTRIBUTION

(71) Applicant: SPEQTRAL PTE. LTD., Singapore (SG)

(72) Inventors: Robert Bedington, Singapore (SG); Tom Vergoossen, Singapore (SG)

(73) Assignee: SPEQTRAL PTE. LTD., Singapore (SG)

( * ) Notice: Subject to any disclaimer, the term of this patent is extended or adjusted under 35 U.S.C. 154(b) by 255 days.

(21) Appl. No.: 18/552,593

(22) PCT Filed: Mar. 29, 2022

(86) PCT No.: PCT/SG2022/050172
§ 371 (c)(1),
(2) Date: Sep. 26, 2023

(87) PCT Pub. No.: WO2022/211731
PCT Pub. Date: Oct. 6, 2022

(65) Prior Publication Data
US 2024/0178994 A1 May 30, 2024

(30) Foreign Application Priority Data
Mar. 30, 2021 (SG) ........................... 10202103245X

(51) Int. Cl.
*H04L 9/08* (2006.01)

(52) U.S. Cl.
CPC .......... *H04L 9/0852* (2013.01); *H04L 9/0869* (2013.01)

(58) Field of Classification Search
None
See application file for complete search history.

(56) References Cited

U.S. PATENT DOCUMENTS 8,213,616 B2 * 7/2012 Bloch ...................... H04K 1/02 714/755
10,958,424 B1 * 3/2021 Chhabra ................ H04L 9/083
(Continued)

FOREIGN PATENT DOCUMENTS

WO 2019/234406 A1 12/2019
WO 2021/025749 A1 2/2021
WO 2021/197548 A1 10/2021

OTHER PUBLICATIONS

Mikio Fujiwara, et al., "Free-space optical wiretap channel and experimental secret key agreement in 7.8 km terrestrial link," Opt. Express 26, 19513-19523 (2018) https://doi.org/10.1364/OE.26.019513.

*Primary Examiner* — Trang T Doan
(74) *Attorney, Agent, or Firm* — Volpe Koenig

(57) ABSTRACT

Methods, nodes and systems for secure symmetric key distribution are described. A method of creating symmetric keying material shared between a first node and a second node is provided. The method comprises: establishing a key-generation channel between the first node and the second node; generating shared symmetric master keying material using physical layer security methods on the key-generation channel; generating random numbers as local keying material on the first node; encrypting the local keying material using some or all of the shared symmetric master keying material to generate encrypted local keying material on the first node; sending the encrypted local keying material from the first node to the second node over a communication channel; and decrypting the encrypted local keying material on the second node using the corresponding shared symmetric master keying material to create symmetric keying material.

20 Claims, 4 Drawing Sheets

(56) References Cited

U.S. PATENT DOCUMENTS

| | | | | |
|---|---|---|---|---|
| 11,722,297 | B2 * | 8/2023 | Blasl | G02F 1/03<br>380/44 |
| 11,728,981 | B2 * | 8/2023 | Balmakhtar | H04W 12/06 |
| 11,750,379 | B2 * | 9/2023 | Bedau | G06F 21/602<br>380/279 |
| 11,895,232 | B1 * | 2/2024 | Stapleton | H04L 9/0861 |
| 11,995,194 | B1 * | 5/2024 | Shea | H04L 9/0852 |
| 2004/0161111 | A1 | 8/2004 | Sherman | |
| 2006/0059343 | A1 | 3/2006 | Berzanskis | |
| 2013/0083926 | A1 * | 4/2013 | Hughes | H04L 9/3247<br>380/278 |
| 2013/0163759 | A1 | 6/2013 | Harrison | |
| 2016/0285629 | A1 * | 9/2016 | Tanizawa | H04L 9/0852 |
| 2017/0104595 | A1 * | 4/2017 | Huang | H04L 9/0852 |
| 2017/0230170 | A1 * | 8/2017 | Huth | H04L 9/0852 |
| 2020/0021433 | A1 * | 1/2020 | Zaman | H04B 10/25 |
| 2020/0274701 | A1 | 8/2020 | Yuan | |
| 2020/0396091 | A1 * | 12/2020 | Booher | G09C 1/00 |
| 2022/0166613 | A1 * | 5/2022 | Cruz | G09C 5/00 |

* cited by examiner

SECURE SYMMETRIC KEY DISTRIBUTION

TECHNICAL FIELD

The present disclosure relates to the out of band distribution of symmetric encryption keys in communication networks such as quantum key distribution networks.

BACKGROUND

Symmetric key encryption is a type of secure communication in which the same encryption key is used for both encryption and decryption of messages. An important aspect of symmetric key encryption is key exchange as secret encryption keys must be distributed to parties before secure communication can take place. Out of band key distribution is a method of symmetric key exchange in which encryption keys are exchanged on a different channel from that which is used for encrypted communication.

QKD (quantum key distribution) networks provide out-of-band symmetric encryption keys between end nodes, but the QKD process alone is very slow compared to state-of-the-art conventional data communication methods. This problem is exacerbated in the case of satellite QKD when the satellite is often only in range of a ground station for a few minutes every day, and can only perform QKD on a few of those days each month when the sky is not cloudy.

SUMMARY

The present disclosure provides methods and systems for sharing keying material between nodes.

According to a first aspect of the present disclosure, a method of creating symmetric keying material shared between a first node and a second node is provided. The method comprises: establishing a key-generation channel between the first node and the second node; generating shared symmetric master keying material using physical layer security methods on the key-generation channel; generating random numbers as local keying material on the first node; encrypting the local keying material using some or all of the shared symmetric master keying material to generate encrypted local keying material on the first node; sending the encrypted local keying material from the first node to the second node over a communication channel; and decrypting the encrypted local keying material on the second node using the corresponding shared symmetric master keying material to create symmetric keying material.

The key generation channel may be a quantum channel or other channel with a high security. Generally, such channels have a low throughput compared with classical channels having lower level of security. In the above method, the shared symmetric master keying material is used to encrypt random numbers for transmission over the communication channel since the communication channel has a higher throughput rate than the key distribution channel, more keying material can be shared using the communication channel than over the key-distribution channel.

The key generation channel and/or the communication channel may be free space channels. The method may be implemented in a satellite key distribution system in which the first node is a satellite node and the second node is a ground node.

The communication channel may be an optical channel, for example a free space optical channel. One advantage of free space optical channels (FSOs), for example a satellite FSO channel, compared to fiber or RF connections is that the whole physical channel can be more easily monitored. This is because an eavesdropper may have to be physically close to the second node in order to intercept communications and therefore the whole channel can be physically monitored, for example using radar or visual observations. In some embodiments where the key distribution channel is a quantum channel, the communication channel may be implemented over using a common optical link as the quantum channel.

In an embodiment, the second node may also be provided with a random number generator and the method may further comprise: generating random numbers as additional local keying material on the second node; encrypting the additional local keying material using some or all of the shared symmetric master keying material to generate encrypted additional local keying material on the second node; sending the encrypted additional local keying material from the second node to the first node over a communication channel; and decrypting the encrypted additional local keying material on the first node to create additional symmetric keying material.

The method may comprise sending the local keying material to a third node in addition to the second node. Such a method further comprises: establishing a second key-generation channel between the first node and a third node; generating second shared symmetric master keying material using physical layer security methods on the second key-generation channel; encrypting local keying material using some or all of the second shared symmetric master keying material to generate a second encrypted local keying material on the first node; sending the second encrypted local keying material from the first node to the third node over a second communication channel; and decrypting the second encrypted local keying material on the third node using the corresponding second shared symmetric master keying material.

The first node may be a satellite node and the second node and the third node are ground nodes. Thus, the ground nodes may use the symmetric keying material to communication with one another.

The encryption of local keying material using some or all of the shared symmetric master keying material to generate encrypted local keying material may comprise encrypting the local keying material according to an advanced encryption standard (AES) algorithm wherein an AES key is generated using some or all of the shared symmetric master keying material as a seed key, and wherein sending the encrypted local keying material from the first node to the second node over the communication channel comprises sending the encrypted local keying material according to an AES algorithm.

According to a second aspect of the present disclosure, a method in a first node of sharing symmetric keying material with a second node is provided. The method comprises: establishing a key-generation communication channel with the second node; generating shared symmetric master keying material using physical security methods on the key-generation channel; generating a random number as local keying material; encrypting the local keying material using some or all of the shared symmetric master keying material to generate encrypted local keying material; and sending the encrypted local keying material to the second node over a communication channel.

According to a third aspect of the present disclosure, a method in a second node of receiving symmetric keying material from a first node is provided. The method comprises: establishing a key-generation channel with the first node; generating a shared symmetric master keying material using physical layer security on the key-generation channel; receiving encrypted local keying material from the first node over a communication channel; and decrypting the encrypted local keying material key using the shared symmetric master keying material to create symmetric keying material.

According to a fourth aspect of the present disclosure, a first node of a communication system is provided, the first node comprises: physical layer security module configured to: establish a key-distribution channel between the first node and a second node of the communication system; and generate a shared symmetric master keying material using physical layer security method on the key-distribution channel; a random number generator configured to: generate random numbers as local keying material; a key management module configured to: encrypt the local keying material using the using the some or all of the shared symmetric master keying material to generate encrypted local keying material; and a communication module configured to: send the encrypted local keying material to the second node.

According to a fifth aspect of the present disclosure a second node of a communication system is provided. The second node comprises: a physical layer security module configured to: establish a key-distribution channel between the second node and a first node of the communication system; and generate shared symmetric master keying material using physical layer security on the key-distribution channel; a communication module configured to: receive encrypted local keying material from the first node; and a key management module configured to: encrypt the encrypted local keying material using the using the shared symmetric master keying material to create symmetric keying material.

According to a sixth aspect of the present disclosure, a communication system comprising a first node as set out above; and a second node as set out above is provided.

BRIEF DESCRIPTION OF THE DRAWINGS

In the following, embodiments of the present invention will be described as non-limiting examples with reference to the accompanying drawings in which.

DETAILED DESCRIPTION

Figure 1:
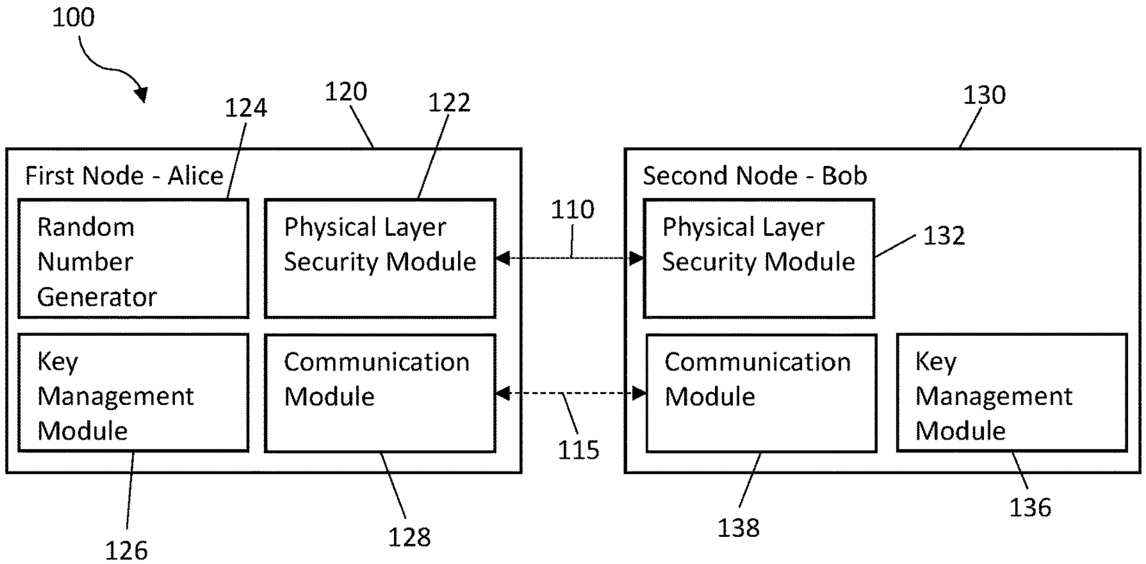
FIG. 1 is a block diagram showing a communication system for secure symmetric key distribution according to an embodiment of the present invention.

FIG. 1 is a block diagram showing a communication system for secure symmetric key distribution according to an embodiment of the present invention. The communication system 100 comprises a first node 120, which is referred to as Alice and a second node 140 which is referred to a Bob. The first node 120 and the second node 130 are connected via a first channel 110 and via a second channel 115. The first channel 110 is referred to in parts of this disclosure as a key distribution channel and the second channel is referred to in parts of this disclosure as a communication channel. In some embodiments as described in more detail below, the first channel 110 is a quantum communication channel and the second channel 115 is a classical communication channel. However, more generally, the first channel 110 is a channel having relatively high security but data bandwidth, whereas the second channel 115 is relatively less secure but has a higher data bandwidth.

The first node 120 comprises a physical layer security module 122, a random number generator 124, a key management module 126 and a communication module 128. The physical layer security module 122 allows the first channel 110 to be generated between the first node and the second node 130 as a secure channel to function as a key generation channel. The random number generator 124 may be implemented as a pseudorandom number generator or a true random number generator such as a quantum random number generator. Any random method can be used, some can be certifiably random e.g. using the output from an entangled photon source. The key management module 126 provides storage and processing for encryption keys. The communication module 128 allows communication between the first node 120 and the second node 130 over the second channel 115. The communication module 128 may be configured to provide encrypted communications between the first node 120 and the second node 130 over the second channel 115. In some implementations, the key management module 126 provides the communication module 128 with keying material such as AES seed keys and then these are used to encrypt the entire communication channels or sessions by the communication module 128.

The second node 130 comprises a physical layer security module 132, a key management module 136 and a communication module 138. The physical layer security module 132 allows the first channel 110 to be generated between the first node and the second node 130 as a secure channel to function as a key generation channel. The key management module 136 provides storage and processing for encryption keys. The communication module 138 allows communication between the second node 130 and the first node 120 over the second channel 115. The communication module 138 may be configured to provide encrypted communications between the second node 130 and the first node 120 over the second channel 115. In some implementations, the key management module 136 provides the communication module 138 with keying material such as AES seed keys and then these are used to encrypt the entire communication channels or sessions by the communication module 138. It is noted that in this embodiment, the second node 130 does not comprise a random number generator. However, as described below with reference to FIG. 3, embodiments are envisaged in which both the first node and the second node are provided with a random number generator.

Figure 2:
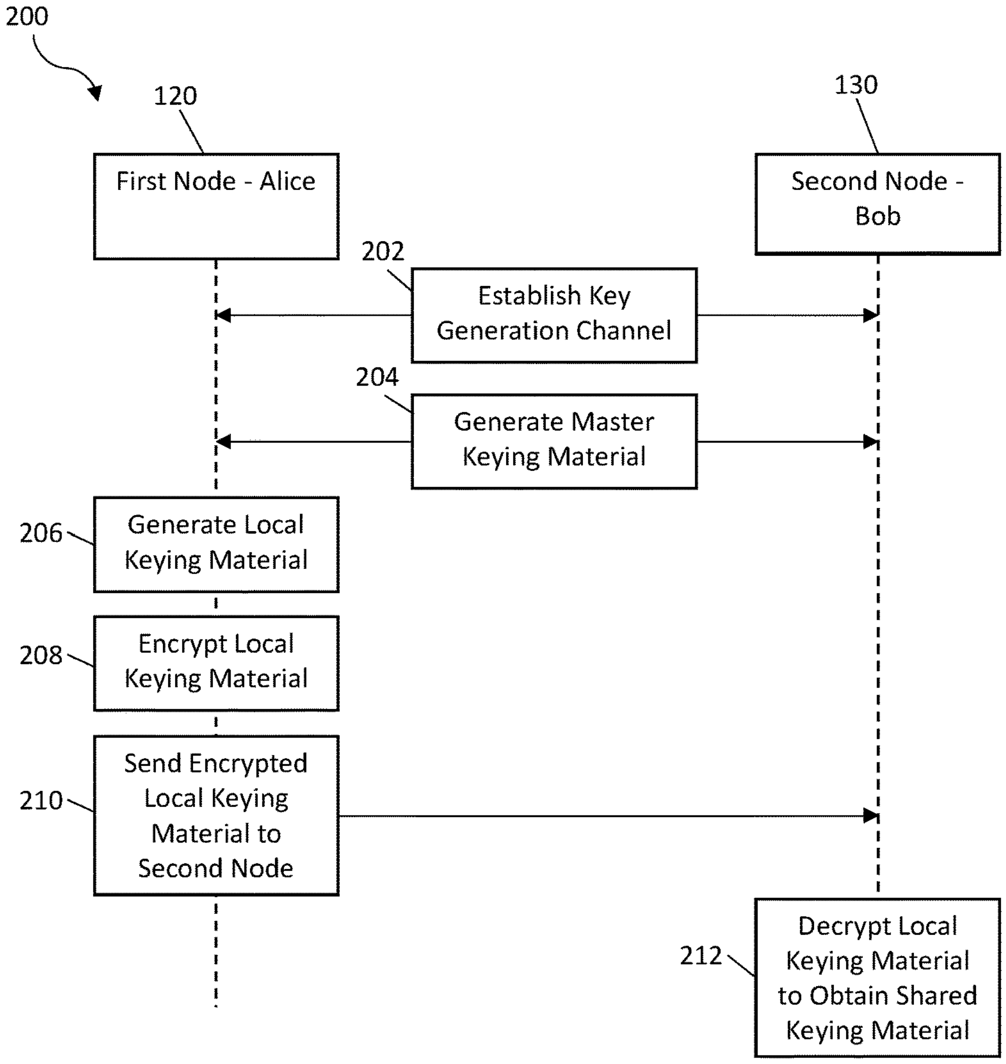
FIG. 2 is a message flow diagram showing a method of creating symmetric keying material shared between a first node and a second node according to an embodiment of the present invention.

FIG. 2 is a message flow diagram showing a method of creating symmetric keying material shared between a first node and a second node according to an embodiment of the present invention. The method 200 shown in FIG. 2 is carried out between the first node 120 and the second node 130 shown in FIG. 1.

In step 202, the physical layer security module 122 of the first node 120 and the physical layer security module 132 of the second node 130 establish a key generation channel over the first channel 110.

In step 204, the physical layer security module 122 of the first node 120 and the physical layer security module 132 of the second node 130 generate master keying material. The master keying material comprises a master key or set of master keys which are shared between the first node 120 and the second node 130.

Steps 202 and 204 may be implemented according to a photon key distribution protocol as described international patent application publication WO2019139544A1 or Vergoossen, Tom; Bedington, Robert; Grieve, James A.; Ling, Alexander. 2019. "Satellite Quantum Communications When Man-in-the-Middle Attacks Are Excluded" Entropy 21, no. 4: 387. https://doi.orc/10.3390/e21040387. Such protocols are similar to quantum key distribution (QKD) protocols but have some of the eavesdropper detecting steps removed.

In both QKD and photon key distribution protocols, bits of information are encoded on bits of information are encoded in extremely weak light signals, e.g. single photons, therefore in embodiments of the present invention, the key distribution channel is a channel in which bits of information are in extremely weak light signals such as single photons.

In step 206, the random number generator 124 of the first node 120 generates a set of random numbers as local keying material.

In step 208, the key management module 208 of the first node 120 encrypts the local keying material using the master key. This generates encrypted local keying material.

The encryption of the local keying material using the master key may comprise encrypting the local keying material according to an advanced encryption standard (AES) algorithm wherein an AES key is generated using some or all of the shared symmetric master keying material as a seed key. Other symmetric key expansion algorithms besides AES may be used to generate the encrypted local keying material.

In step 210, the communication module 128 of the first node 120 sends the encrypted local keying material to the second node 130 over the second channel 115. The communication module 138 of the second node 130 receives the encrypted local keying material. The encrypted local keying material may be transmitted over the second channel 115 according to an AES algorithm.

In step 212, the key management module 136 of the second node 130 decrypts the local keying material. Thus, following step 212, both the first node 120 and the second mode 130 have the local keying material. The local keying material may then be used by the first node 120 and the second node 130 as shared symmetric keying material.

The shared symmetric keying material may be used by the first node 120 and the second node 130 as traffic protection keys (TPKs) for encrypted communications.

A privacy amplification step may be added whereby the random bits used to generate the TPK are shuffled and/or combined/compressed after the transmission between nodes has been completed.

In the embodiment described above with reference to FIG. 1 and FIG. 2, the first node 120 has a random number generator, but the second node 130 does not. Embodiments are envisaged in which both the first node and the second node have a random number generator. A second node having a random number generator is shown in FIG. 3.

Figure 3:
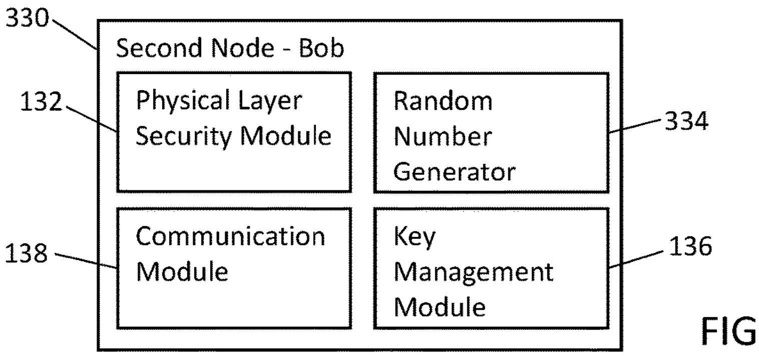
FIG. 3 is a block diagram showing a second node of a communication system according to an embodiment of the present invention.

FIG. 3 is a block diagram showing a second node of a communication system according to an embodiment of the present invention. As shown in FIG. 3, the second node 330 comprises a physical layer security module 132, a random number generator 334, a key management module 136 and a communication module 138. The physical layer security module 132 allows the first channel 110 to be generated between the first node and the second node 130 as a secure channel to function as a key generation channel. The random number generator 334 may be implemented as a pseudorandom number generator or a true random number generator such as a quantum random number generator. The key management module 136 provides storage and processing for encryption keys. The communication module 138 allows communication between the second node 130 and the first node 120 over the second channel 115.

Figure 4:
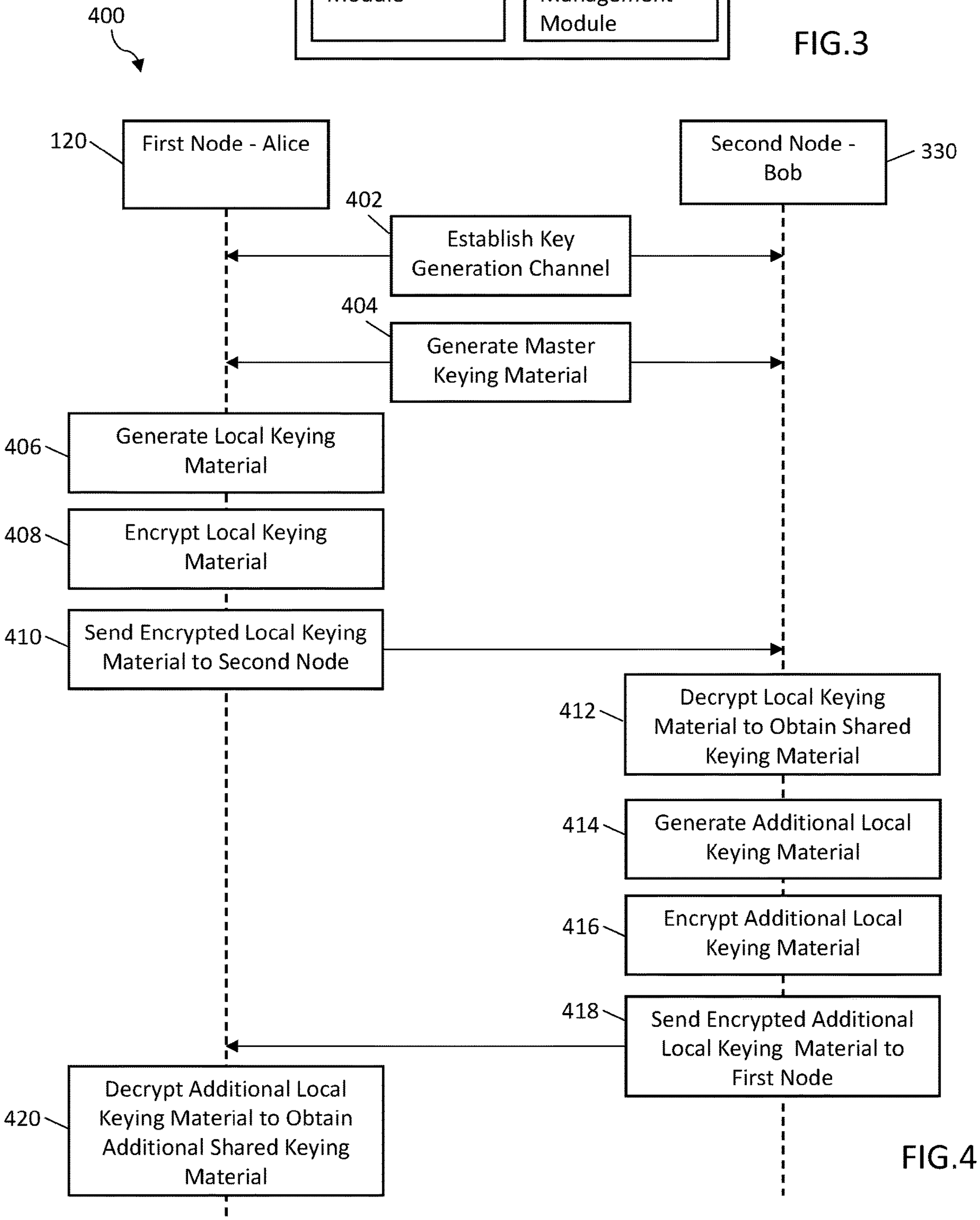
FIG. 4 is a message flow diagram showing a method of creating symmetric keying material shared between a first node and a second node according to an embodiment of the present invention.

FIG. 4 is a message flow diagram showing a method of creating symmetric keying material shared between a first node and a second node according to an embodiment of the present invention in which both the first node and the second node comprise a random number generator. The method 400 shown in FIG. 4 is carried out between the first node 120 show in FIG. 1 and the second node 330 shown in FIG. 3.

Steps 402 to 412 shown in FIG. 4 correspond to steps 202 to 212 shown in FIG. 2 respectively, and these steps are carried out as described above with reference to FIG. 2.

In step 414, the random number generator 334 of the second node 330 generates a set of random numbers as additional local keying material.

In step 416, the key management module 136 of the second node 330 encrypts the additional local keying material using the master key. This generates encrypted additional local keying material. The encryption of the additional local keying material using the master key may comprise encrypting the local keying material according to an advanced encryption standard (AES) algorithm wherein an AES key is generated using some or all of the shared symmetric master keying material as a seed key.

In step 418, the communication module 138 of the second node 330 sends the encrypted additional local keying material to the first node 120 over the second channel 115. The communication module 128 of the first node 120 receives the encrypted additional local keying material. The encrypted additional local keying material may be transmitted over the second channel 115 according to an AES algorithm.

In step 420, the key management module 126 of the first node 120 decrypts the local keying material. Thus, following step 420, both the first node 120 and the second mode 330 have both the local keying material and the additional local keying material. The local keying material and the additional local keying material may then be used by the first node 120 and the second node 330 as shared symmetric keying material. As described above, the shared symmetric keying material may be used by the first node 120 and the second node 330 as traffic protection keys for encrypted communications. It will be appreciated that while FIG. 4 shows steps 406-412 followed by steps 414-420, the exchange of encrypted local keying material and encrypted additional local keying material between the first node 120 and the second node 330 may take place as a series of communication exchanges on the second channel 115.

Figure 5:
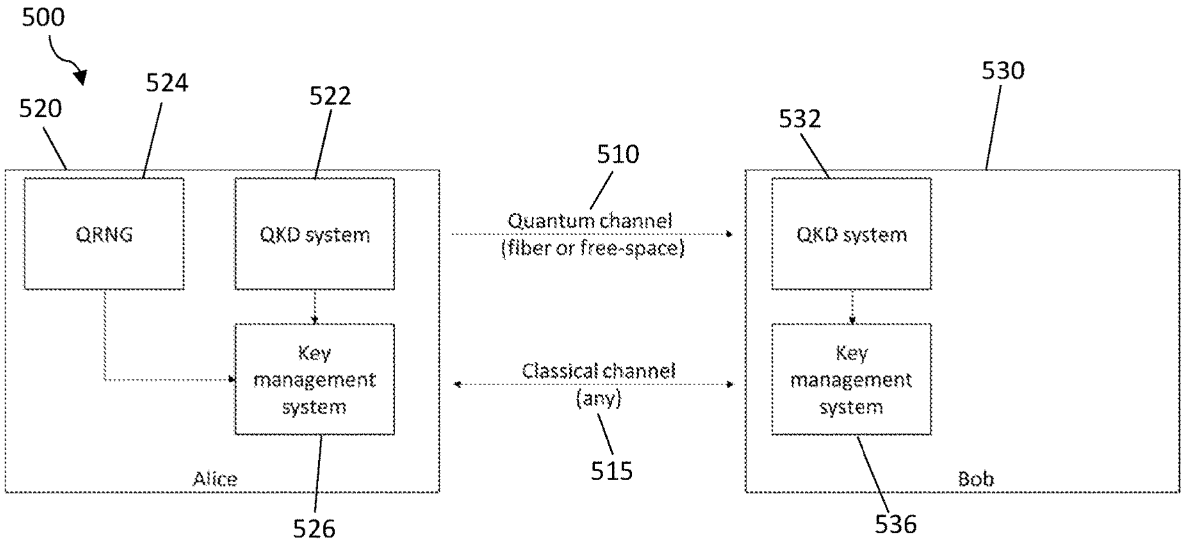
FIG. 5 is a block diagram showing a communication system for secure symmetric key distribution comprising a quantum channel and a classical channel according to an embodiment of the present invention.

The first channel may be implemented as quantum communication channel. Such an embodiment is shown in FIG. 5. FIG. 5 is a block diagram showing a communication system for secure symmetric key distribution comprising a quantum channel and a classical channel according to an embodiment of the present invention.

As shown in FIG. 5, the communication system 500 comprises a first node 520 which is referred to as Alice and a second node 530 which is referred to as Bob. The first node 520 and the second node 530 are connected by a quantum channel 510 and by a classical channel 510. The quantum channel 510 may be a free space quantum channel or a fiber optic quantum channel. The classical channel 515 may be any type of communication channel such as a wired channel, a fiber optic channel, a radio frequency channel, or an optical channel.

The first node 520 comprises a quantum key distribution (QKD) system 522, a quantum random number generator (QRNG) and a key management system 526. The QKD system 522 allows exchange of QKD qubits between the first node 520 and the second node 530 over the quantum channel 510. The QRNG 526 operates to generate random numbers which may be used in a QKD exchange process between the first node 520 and the second node 530, random numbers generated by the QRNG 526 are also used to generate local keying material on the first node 520. It is noted that quantum random number generators can typically produce random numbers for encryption key material much faster than QKD devices can distribute keys, and this data can be therefore be stored and used for as the local keying material. The key management system 526 corresponds to the key management module described above with reference to FIG. 1 to FIG. 4 and operates to manage local keying material and to generate and store traffic protection keys based on the local keying material.

The second node 530 comprises a quantum key distribution (QKD) system 532, a and a key management system 536. The QKD system 532 allows exchange of QKD qubits between the first node 520 and the second node 530 over the quantum channel 510. The key management system 536 corresponds to the key management module described above with reference to FIG. 1 to FIG. 4 and operates to manage local keying material and to generate and store traffic protection keys based on the local keying material.

The first node 520 and the second node 530 also comprise a classical communication module which allows communication over the classical channel. This classical communication module corresponds to the communication module of the first and second nodes shown in FIG. 1.

In operation, the communication system 500 carries out an implementation of the method 200 described above with reference to FIG. 2. The communication system 500 can provide secure out-of-band encryption key delivery system based on quantum communication. It leverages an information theoretically secure quantum key distribution steps to establish Master Keys (MKs) between the first node 520 and the second node 530, and uses these MKs to transmit random numbers for future use as symmetric keying material (e.g. for Traffic Protection Keys) between nodes.

Initially, the first node 520 and the second node 530 establish communication over the quantum channel 510 and exchange QKD qubits. Then over the classical channel 515, which may be authenticated using a using a pre-shared key, or quantum-safe authentication method, error correction and privacy amplification are performed and the final result is a shared encryption key between the first node 520 and the second node 530. This key can be said to consist of a number of Master Keys. These Master Keys are used to create an encrypted communications channel between the first node 520 and the second node 530 over the classical communication channel. The encrypted communication channel may be created by using the master keys as the seeds for AES-256 Media Access Control Security or Internet Protocol Security encryption or both. The first node 520 produces additional random keying material using the quantum random number generator 524. This is transmitted across the encrypted classical communication channel 515. Thus, the first node 520 and the second node 530 now share a larger amount of keying material than could be produced through the QKD process alone and this keying material may be used as traffic protection keys.

The communication system 500 may be implemented as a satellite key delivery system with the first node being a low earth orbit trusted key delivery node satellite and the second node being one of a number of ground nodes which receive keying material the satellite. Generally, such satellites can produce QRNG material at all times and establish QKD keys opportunistically with the ground stations they pass over. The QKD-secured data channel for transferring the keys could be over a global RF (radio frequency) network. Alternatively, the communication channel may be implemented as a high speed laser communication channel. In some embodiments, a satellite system could be equipped for key distribution over both RF and laser communication links. In such embodiments, the RF link could be used in cloudy conditions or when the optical link is not available. The traffic management keys could be downloaded from the satellite over a radio frequency link using a master key that had been established previously. In some embodiments, the communication channel could be implemented as a combination of radio frequency and other communication link such as the internet, in such embodiments, the master keys would provide end-to-end encryption.

The implementation in which the communication channel is implemented as a free space optical link potentially has a higher security of key delivery as described below.

Figure 6:
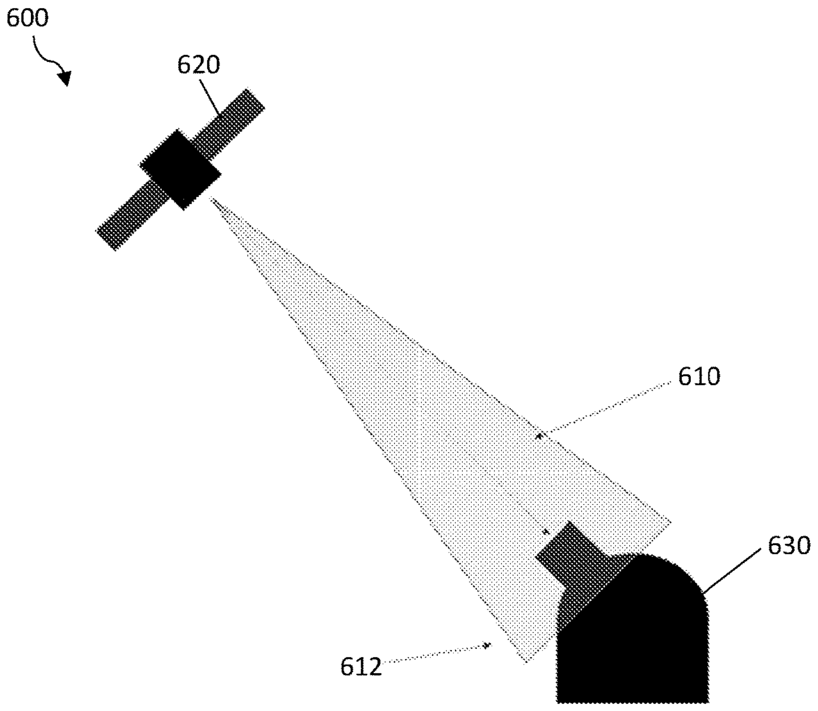
FIG. 6 shows an application of secure symmetric key distribution in a satellite network according to an embodiment of the present invention.

FIG. 6 shows an application of secure symmetric key distribution in a satellite network according to an embodiment of the present invention. As shown in FIG. 6, the key distribution system 600 comprises a satellite 620 which functions as the first node and a ground station 630 which functions as the second node. An optical link 610 is used both as the quantum channel for QKD and as the classical channel for transmission of the encrypted local keying material.

Using the optical link 610 for performing the transmission of the encrypted local keying material has the following advantages. Firstly, the optical link 610 imposes physical access constraints on any eavesdropper since in order to intercept optical signals transmitted over the optical link 610, the eavesdropper would have to be within the beam 612 of the optical link 610. Steps can be made to rule out the physical presence of eavesdroppers in this channel using radar and visual scans. In addition, if the transmissions over the QKD channel are performed concurrently with the encrypted transmissions over the classical channel, then the presence of eavesdroppers can be detected since QKD inherently checks for the presence of eavesdroppers.

The threat of eavesdroppers around the channel (catching scattered light) can be reduced by using the weakest feasible laser and using virtual Eve methods to quantify how much information such eavesdroppers can glean. As described in Mikio Fujiwara, Toshiyuki Ito, Mitsuo Kitamura, Hiroyuki Endo, Orie Tsuzuki, Morio Toyoshima, Hideki Takenaka, Yoshihisa Takayama, Ryosuke Shimizu, Masahiro Takeoka, Ryutaroh Matsumoto, and Masahide Sasaki, "Free-space optical wiretap channel and experimental secret key agreement in 7.8 km terrestrial link," Opt. Express 26, 19513-19523 (2018) https://doi.ora/10.1364/OE.26.019513.

It is envisaged that securely delivering randomness between space and ground in this manner can potentially allow satellite network nodes to achieve similar performance levels to fiber QKD network nodes to prevent satellite connections from being a bottleneck in global out-of-band key distribution networks.

Embodiments of the present invention may be implemented as a satellite or a constellation of satellites which share keys across a plurality of ground nodes. An example of such a system is described below with reference to FIG. 7.

Figure 7:
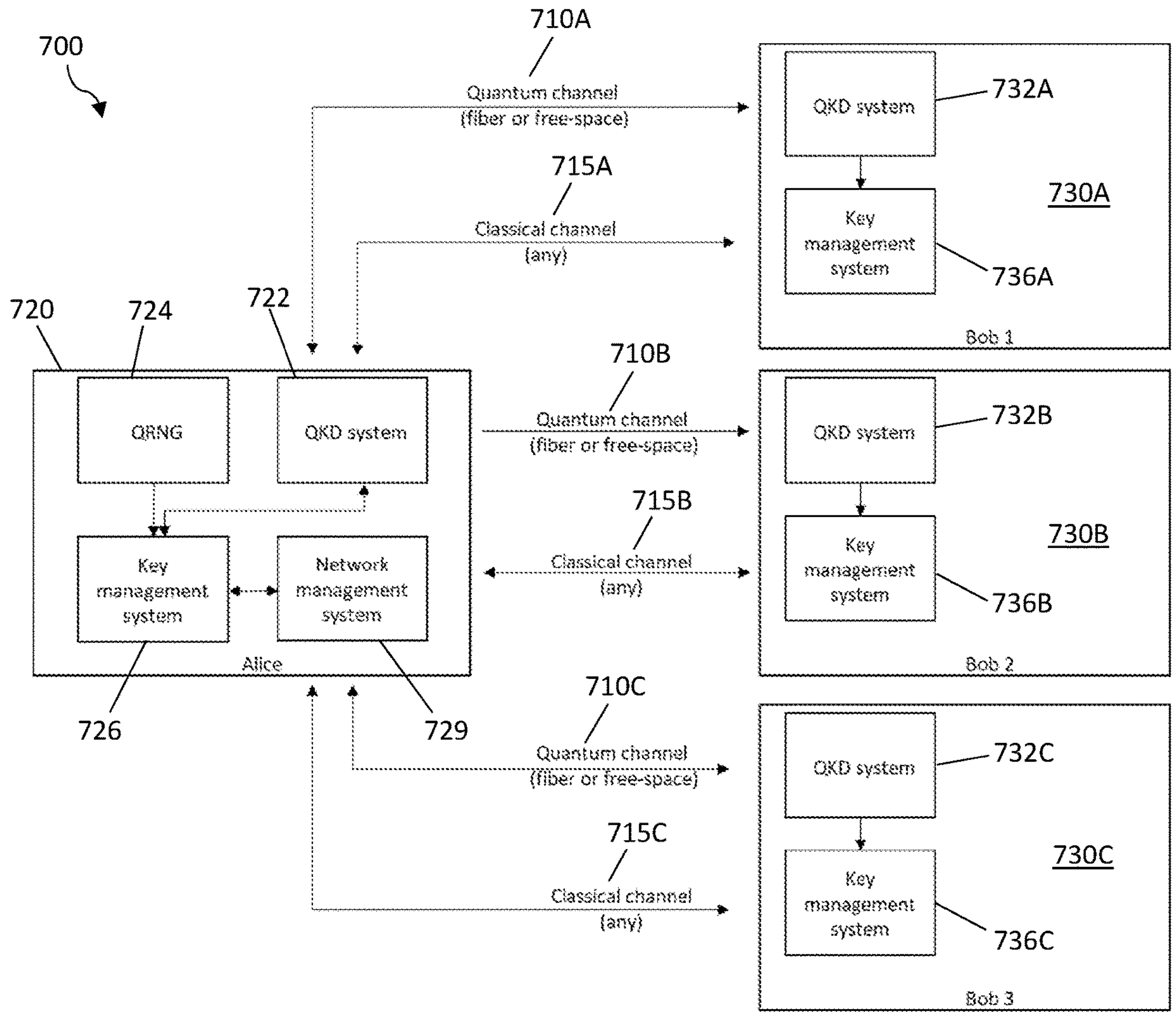
FIG. 7 is block diagram showing a communication system for secure symmetric key distribution among a plurality of nodes according to an embodiment of the present invention.

FIG. 7 is block diagram showing a communication system for secure symmetric key distribution among a plurality of nodes according to an embodiment of the present invention. The communication system 700 comprises one Alice node or first node 720 and three Bob nodes or second nodes 730A, 730B and 730C. The first node 720 comprises a quantum key distribution (QKD) system 722, a quantum random number generator (QRNG) 724, a key management system 726 and a network management system 729. The QKD system 722, the QRNG 724, and the key management system 726 are configured as described above with reference to FIG. 5. The network management system 729 controls the sharing of traffic keys based on local keying material generated by the QRNG 724. For example, the network management system 729 may control the sharing of traffic keys such that all the second nodes 730A-C have possession of the same set of traffic keys which can then be used for communication between the second nodes 730A-C. This may potentially be used where the second nodes 730A-C form a network private to one organization. Alternatively, the network management system 729 may control the sharing of traffic keys such that pairs of the second nodes 730A-C are provided with a unique set of traffic keys to allow private encrypted communication between pairs of the second nodes 730A-C.

The network management system 729 may control the traffic key distribution to keep the traffic keys with each second node 730A-C separately as per the key distribution constellation described in Tom Vergoossen, Sergio Loarte, Robert Bedington, Hans Kuiper, Alexander Ling, Modelling of satellite constellations for trusted node QKD networks, Acta Astronautica, Volume 173, 2020, Pages 164-171, ISSN 0094-5765, https://doi.org/10.1016/j.actaastro.2020.02.010. In such an implementation satellites (the first nodes) act as trusted nodes and only share keys with other ground stations (the second nodes) using XORs of key pairs which can be transmitted publicly, e.g. via a 3rd party ground station network. This scenario is most relevant when the second nodes are more independent users, e.g. customers of a service provided by a satellite constellation operator controlling the first node 720.

A satellite or constellation of satellites configured as the first node may operate according to a combination of the use cases mentioned above.

Each of the second nodes 730A-C comprises a quantum key distribution (QKD) system 732A-C and a key management system 736A-C which each operate as described above with reference to FIG. 5. Each of the second nodes 730A-C communicates with the first node 720 though a separate pair of a quantum communication channel 710A-C and a classical communication channel 715A-C.

In operation, the first node 720 implements the method shown in FIG. 2 with one of the second nodes (for example second node Bob 1 730A) by firstly establishing a key distribution channel over the quantum channel 710A, a set of master keys are generated for communication between the first node 720 and that specific second node (Bob 1 730A) then local keying material is generated and may be stored on the first node 720 for later transmission to other second nodes. The local keying material is then encrypted using a master key generated with the second node Bob 1 730A. The encrypted local keying material is then transmitted over the classical channel 715A to the second node Bob 1 730A. If the same local keying material is also to be shared with one or more of the other second nodes, then the first node 720 will establish a key distribution channel with one of the other second nodes (for example second node Bob 2 730B) and generate a new set of master keys over the corresponding quantum channel 710B. Then the local keying material is encrypted with one of the new master keys for transmission to the second node Bob 2 over the corresponding classical channel 715B.

Thus, even where the same keying material is shared between multiple second nodes, it is encrypted with unique master keys for transmission to each of the different second nodes.

The second nodes 730A-C (for example ground stations) may also contain random number generators and use these to share randomness between other second nodes using secure channels encrypted using symmetric keys they have received from the first node 720 (for example a satellite or satellite constellation).

The systems and methods of the present disclosure allow the remote update of master keys among multiple parties in a communication system. In existing systems, master keys are typically distributed before communication (for example by being installed in the system when it is set up) and then either used until end of life of the system or updated using a trusted courier. Master keys are not generally updated remotely, since they would need to be encrypted with a key of a higher security. The present disclosure provides for unlimited refreshing of master keys in a secure manner. While an initial pre-shared key may be required for authentication, this key does not contribute to any subsequent master keys that are generated. Subsequent authentication rounds may use master keys from the previous key generation session. This means the master keys have forward security, i.e. a breach of a master key in the past does not invalidate future master keys.

Figure 8:
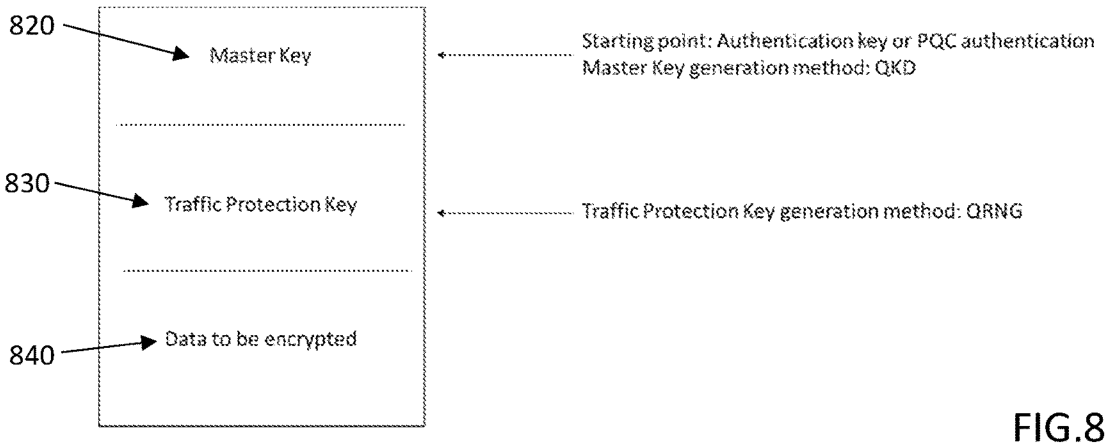
FIG. 8 illustrates the key and data security hierarchy in embodiments of the present invention.

FIG. 8 illustrates the key and data security hierarchy in embodiments of the present invention. As shown in FIG. 8, the top level of the hierarchy are the Master Keys (MKs) 810 which may be generated starting from an authentication key or post-quantum cryptography (PQC) authentication using quantum key distribution (QKD). The next level in the key hierarchy are the Traffic Protection Keys (TPKs) 820 that, once shared, are used to encrypt user data 830. These keys are generated using a QRNG to be certifiably random. TPKs are encrypted with MKs and then transmitted to Bob. This step can increase the size of key available for traffic protection (compared to just using MKs as TPKs) by many orders of magnitude, using a key-expansion algorithm such as AES-256, which is commonly understood to be quantum-resistant.

The random numbers generated by one of the two communicating parties are encrypted with a Master Key. Once transmitted the random numbers can be used as a Traffic Protection Key (TPK) according to an organization's security policy, ranging from their use as session keys to One-Time-Pad (OTP). Similarly, the number of TPKs encrypted with a MK is user dependent. The method by which the TPKs are encrypted is also user dependent, but AES-256 is a quantum-resistant choice.

Additional security is achievable through the classical channel key delivery method. Since QKD requires a physical quantum link between two sites, there is (unless it is over fibre) an opportunity to do this over a free-space channel. This channel may have physical access security. This becomes especially relevant when applied to the space-to-ground scenario, where it is impractical for an eavesdropper to gain access to a secured ground station site. With beam diameters on the ground of commonly >50 m, this may satisfy user threat models. Thus, with QKD guaranteeing secure MKs, and physical access constraints in place, very large amounts of key material can be distributed. If performed in such a manner, the systems and methods described protect against harvest and decrypt attacks when re-keying is performed over the internet.

Whilst the foregoing description has described exemplary embodiments, it will be understood by those skilled in the art that many variations of the embodiments can be made within the scope and spirit of the present invention.

The invention claimed is:

1. A method of creating symmetric keying material shared between a first node and a second node, the method comprising:

establishing a key-generation channel between the first node and the second node;

sharing master keying material comprising at least a first master key between the first node and the second node using physical layer security methods on the key-generation channel;

generating a first amount of random numbers as local keying material on the first node whereby the local keying material and the master keying material are available on the first node;

encrypting the local keying material using the first master key to generate encrypted local keying material on the first node;

sending the encrypted local keying material from the first node to the second node over a communication channel, wherein the communication channel has a higher throughput than the key-generation channel; and decrypting the encrypted local keying material on the second node using the first master key whereby the local keying material is recovered at the second node, whereby the master keying material and the local keying material are available on the second node as the symmetric keying material shared between the first node and second node.

2. The method according to claim 1, wherein the key-generation channel is a quantum communication channel.

3. The method according to claim 1, wherein the key-generation channel and/or the communication channel are free space channels, and optionally wherein the first node is a satellite node and the second node is a ground node.

4. The method according to claim 1, wherein the communication channel is an optical channel, and optionally wherein an optical link in the form of a beam is used for the key-generation channel and/or the communication channel.

5. The method according to claim 1, further comprising:

generating a second amount of random numbers as additional local keying material on the second node;

encrypting the additional local keying material using the first master key to generate encrypted additional local keying material on the second node;

sending the encrypted additional local keying material from the second node to the first node over the communication channel; and decrypting the encrypted additional local keying material on the first node using the first master key to create additional symmetric keying material shared between the first node and second node.

6. The method according to claim 1, further comprising:

establishing a second key-generation channel between the first node and a third node;

generating a second master key shared between the first node and the third node using physical layer security methods on the second key-generation channel;

encrypting the local keying material using the second master key to generate second encrypted local keying material on the first node;

sending the second encrypted local keying material from the first node to the third node over a second communication channel, wherein the second communication channel has a higher throughput than the second key-generation channel; and decrypting the second encrypted local keying material on the third node using the second master key.

7. The method according to claim 6, wherein the second key-generation channel is a quantum communication channel.

8. The method according to claim 1, wherein encrypting the local keying material comprises encrypting the local keying material according to an advanced encryption standard (AES) algorithm wherein an AES key is generated as the first master key using some or all of the first amount of random numbers as a seed key, and wherein sending the encrypted local keying material from the first node to the second node over the communication channel comprises sending the local keying material encrypted according to the AES algorithm.

9. A first node of a communication system, the first node comprising:

a random number generator generating master keying material comprising at least a first master key;

a first transmitter sharing the master keying material between the first node and the second node using a physical layer security method on a key-generation channel;

the random number generator generating a first amount of random numbers as local keying material whereby the local keying material and the master keying material are available on the first node;

an encryptor encrypting the local keying material using the first master key; and a second transmitter sending the encrypted local keying material to the second node over a communication channel for decrypting the encrypted local keying material on the second node using the master key to recover the local keying material at the second node whereby the local keying material and the master keying material are available on the second node as symmetric keying material shared between the first node and the second node, wherein the communication channel has a higher throughput than the key-generation channel.

10. The first node according to claim 9, wherein the key-generation channel is a quantum communication channel.

11. The first node according to claim 9, further comprising a receiver receiving encrypted additional keying material from the second node over the communication channel; and a decryptor decrypting the encrypted additional keying material using the first master key to create additional symmetric keying material shared between the first node and second node.

12. The first node according to claim 9, wherein the first node is a satellite.

13. The first node according to claim 9, wherein an optical link in the form of a beam is used for the key-generation channel and/or the communication channel.

14. The first node according to claim 9, wherein the encryptor operates according to an advanced encryption standard (AES) algorithm wherein an AES key is generated as the master key using some or all of the first amount of random numbers as a seed key.

15. A second node of a communication system, the second node comprising:

a first receiver receiving master keying material comprising at least a first master key from a first node using physical layer security on a key-generation channel;

a second receiver receiving encrypted local keying material comprising an encrypted first amount of random numbers from the first node over a communication channel, wherein the communication channel has a higher throughput than the key-generation channel; and a decryptor decrypting the encrypted local keying material using the first master key to recover the local keying material, whereby the local keying material and the master keying material are available on the second node as symmetric keying material shared between the first node and the second node.

16. The second node according to claim 15, wherein the key-generation channel is a quantum communication channel.

17. The second node according to claim 15, wherein the second node is a ground node.

18. The second node according to claim 15, wherein an optical link in the form of a beam is used for the key-generation channel and/or the communication channel.

19. The second node according to claim 15, wherein the decryptor operates according to an advanced encryption standard (AES) algorithm wherein an AES key is generated as the master key using some or all of the first amount of random numbers as a seed key.

20. A communication system comprising a first node according to claim 9; and a second node according to claim 15.

* * * * *